Figure 1:
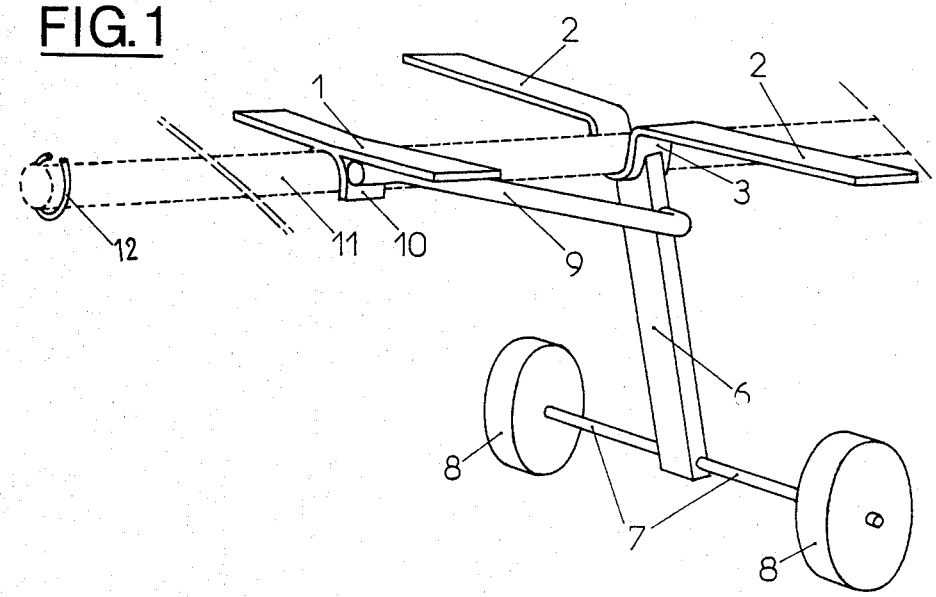

United States Patent [19]

Poulouin

[11] Patent Number: 4,544,172
[45] Date of Patent: Oct. 1, 1985

[54] WHEELED DEVICES FOR CARRYING SAIL BOARDS

[76] Inventor: Armand Poulouin, 2, Chemin des Bruyères Kérity, 22500 Paimpol, France

[21] Appl. No.: 506,721

[22] Filed: Jun. 22, 1983

[30] Foreign Application Priority Data

Jun. 25, 1982 [FR] France .............................. 82 11784

[51] Int. Cl.⁴ ................................................ B60P 3/10
[52] U.S. Cl. ............................. 280/47.13 B; 114/344
[58] Field of Search ................... 280/47.13 B, 47.13 R; 114/344

[56] References Cited

U.S. PATENT DOCUMENTS 3,119,127  1/1964  Taggert ............................. 114/344
4,235,450  11/1980  Conover ............................. 114/344
4,327,933  5/1982  Tuggle ............................. 114/344
4,422,665  12/1983  Hinnant ............................. 114/344

Primary Examiner—Richard A. Bertsch
Attorney, Agent, or Firm—Laff, Whitesel, Conte & Saret

[57] ABSTRACT

A wheeled device for carrying sail boards comprises a support on which the sail board float is set and a fast coupling system for receiving the said board mast. The fast coupling system has two couplers in which the mast is set. Once the sail board mast has been secured to the couplers, the wheeled device is positioned with its front end resting on the ground or in a trailer position on the wheeled device. The axle of the wheels is located far enough back for gravity to jam the mast between the couplers.

20 Claims, 7 Drawing Figures

U.S. Patent  Oct. 1, 1985  Sheet 1 of 4  4,544,172

WHEELED DEVICES FOR CARRYING SAIL BOARDS

The present invention relates to wheeled devices for carrying sail boards.

Known devices of that type are generally associated with a beam for pulling the wheeled device. The beam increases the cost of the wheeled device and is not easy to use, because it is cumbersome and tiresome to assemble. However a beam is a useful device when used as a gripping device. It prevents the sail board float from hitting the ground and being damaged when the float is placed onto the wheeled device.

The device according to the invention has the advantages of such a beam while removing the disadvantages and allowing an optimum service with a minimum size.

The device according to the invention allows the use of the mast of the sail board as a beam. It comprises a wheeled device for being coupled onto the mast length of the sail board, a protecting device being provided for one end of the mast.

The wheeled device is made of a member with two parts, which are used as a support for the sail board float. This member is associated with two ground contact wheels by means of several structure elements and with a fast coupling system of a sail board mast comprising a front mast stop located at the front of the wheeled device and a rear mast stop located a the rear of the wheeled device. The two stops are designed for a fast coupling of the sail board mast onto the wheeled device (eventually with a sail wrapped around the mast), so that, when the mast is fixed in the stops, it may be used as a beam for pulling the wheeled device by gripping the end of the mast which is in front of the wheeled device. The two mast stops are positioned so that the board is located above the mast which was previously assembled with the wheeled device, once the float has been placed onto its supported member. Therefore, the float does not hit the ground and is not damaged when it is placed on the wheeled device. The two assembled parts rest on the ground by means of the end of the mast which is located in front of the wheeled device. A protecting device is fixed at this end of the mast which is located in front of the wheeled device in order to prevent this end from being damaged when it rests on the ground.

When a sail mast is fixed into the mast stops, the mast end is located in front of the wheeled device resting on the ground. Or when the mast is in a position for being used as a pulling member for the wheeled device, the device is such that the mast is clamped in the lateral and upwards directions by the front mast stop, and in the lateral and downwards directions by the rear mast stop. The wheel axle is located rearward enough for allowing the mast to be jammed by gravity into the stops. The jamming force increases as the float of the sail board is placed on the wheeled device. According to one feature of the invention, the wheel axle is clearly behind the rear mast stop. Each stop is provided with a groove for receiving the section of the mast, the grove opening allowing the positioning of the mast.

According to a feature of this invention, one of the stops is not necessarily provided with a groove and is simply intended for clamping the mast in the upwards or in the downwards direction. The other stop has a groove having a length such that the mast is sufficiently and efficiently guided laterally along its length.

According to another feature of the invention, each groove forming a stop is provided with rounded sides corresponding to the shape of the mast cross-section.

According to another feature of the invention, each groove forming a stop is provided with V-shaped sides in order to ensure a point-clamping of the mast.

The last two features are obviously not limitative since a number of alternatives may be adopted in consideration of the function of the grooves, which will be hereafter described.

According to one embodiment of the invention, a typical structure constitutes the wheeled device with a rear swinging position which allows the mast of a small board to freely engage the mast stops, the mast being clamped in the stops when the wheeled device is brought back in its normal position. Furthermore, the wheeled device is easily put in place 1 with both the mast and the wishbone under the float of the sail board. In addition, in this embodiment, the front part of the wishbone forms a support member for the float at the front of the wheeled device as well as a large rest surface for the float with the wheeled device member constituting the float supports. Such an arrangement is particularly useful for setting the float onto the wheeled device. On the other hand, in that embodiment, the cumbersome accessories (mast and wishbone) may be easily put in place under the float of the sail board, which makes it possible to solve a problem encountered with the known wheeled devices, in which a part of the rigging or the whole of the rigging is fixed above the float by means of extendable rubber springs or straps, such as fastening being improvised and tiresome. In this embodiment, all the cumbersome parts (mast, wishbone and float) are rapidly, efficiently and rigidly assembled. A single or several rubber extensible springs or straps are wrapped around the float only while pressing it against the other elements (mast and wishbone).

According to another embodiment of the invention, the wheeled device is comprised of two parallel side-frames for supporting the float of a sail board. The side-frames are connected by means of one or several front crosspieces and one or several rear crosspieces. The crosspieces are disposed in parallel. Each front crosspiece has a front mast stop. Each rear crosspiece has a rear mast stop. Each of the front or rear crosspieces has a bent part at each of its ends which allows, on the one hand, to place the float of a sail board on the side-frames without having the float in contact with the stops, and, on the other hand, to place a wishbone between the side-frames without having the part of the wishbone located between the side-frames in contact with the float when it is taken up onto the wheeled device. One end of each crosspiece is secured to a side-frame. Its other end is secured to the other side-frame. Each side-frame is secured to a suspension member which establishes a connection between the side-frames and the wheel axle.

In another embodiment, the connection between the side-frames and the suspension member is designed so that the wheeled device may be folded through the use of various known devices which are not encompassed by the invention.

In another embodiment, a part of each side-frame projects from the connecting point with the suspension member, at the rear of the wheeled device. The end of each projecting part is used as ground stop when the wheeled device is brought to its rear swinging position. The wheeled device is thus resting on the ground through its wheels and the rear ends of the side-frames, so that the mast of the sail board may be easily engaged between the side-frames.

In another embodiment of the invention, the structure device comprises a member with an appropriate shape for supporting the float of a sail board. The structure includes a part which is located at the front of the wheeled device and a part which is located at the rear of the wheeled device. The last part has a central rear mast stop and is secured to the wheel axle through a suspension member for constituting the rear part of the wheeled device. The rear part is secured to two side-frames located on both sides of the rear mast stop, which secure the front mast stop and the front part of the member operating as a support for the float of a sail board. The mast of a sail board is easily engaged between the side-frames when the wheeled device is brought to the rear swinging position.

In another embodiment of the invention, the rear part of the wheeled device is secured to a single side-frame located on one or the other of the sides of the rear stop. The side frame secures the front mast stop and the front part of the member operating as a support for the float of a sail board. The mast of a sail board is easily engaged into the mast stops when the front mast stop is simply lifted. A spacer is laterally cleared on one side of each mast stop.

In the last two embodiments, the connection of the side-frame or side-frames with the rear part of the wheeled device may be easily designed in such a way that the wheeled device can be folded through the use of known devices which are not encompassed by the invention.

The protecting device is preferably made in the shape of a horseshoe or an open ring with a concave part which is substantially circular. The concave part corresponds to the shape of the cross-section of a sail board mast. The concave part extends symmetrically towards two ends which define an opening space between them.

Such a horseshoe or open ring device is preferably made of a resilient material (a plastic material for instance) so that the two ends may be moved aside in order to pinch and thus fasten the protecting device to one end of the mast of a sail board.

The thickness of the open ring is large enough to cause a part of the external periphery of the ring to be in contact with the ground when the ring is fastened to one end of a sail board mast and the wheeled device is fastened to the length of the mast. The three parts thus assembled rest on the ground through the two wheels of the wheeled device and the ring fastened to one end of the mast.

Another advantage of the typical shape of the ring is to allow the ring to be fastened on one part of the trunk, so that the wheeled device itself may be properly used without the risk of loosing the ring.

The ring may be fastened on the wheeled device because an element of the wheeled device has a thickness greater than the distance between the two ends of the ring, so that the latter cannot come off when it is engaged on the element.

Figure 2:
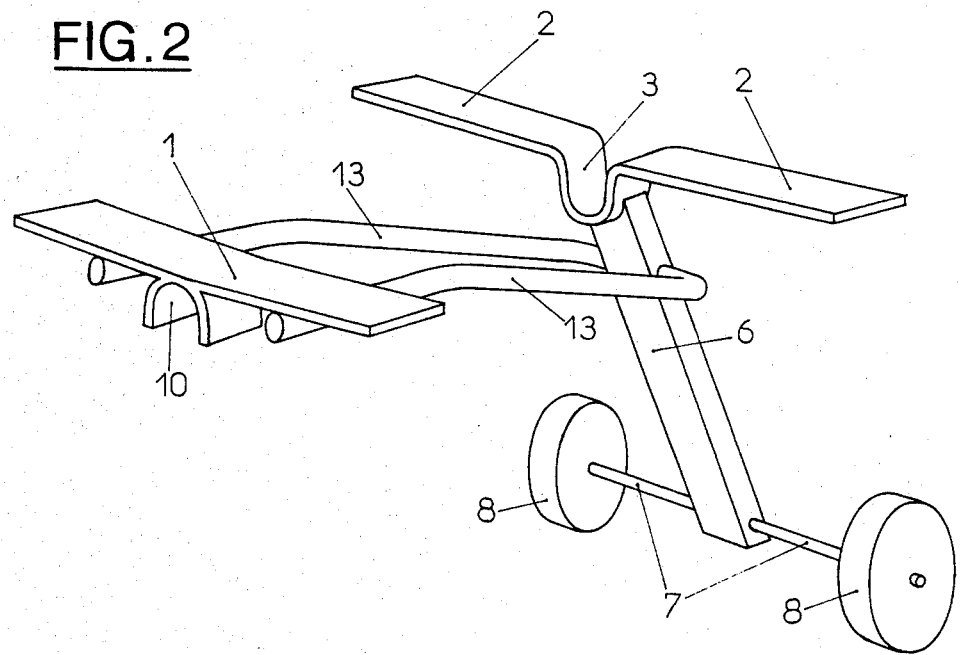
Figure 3:
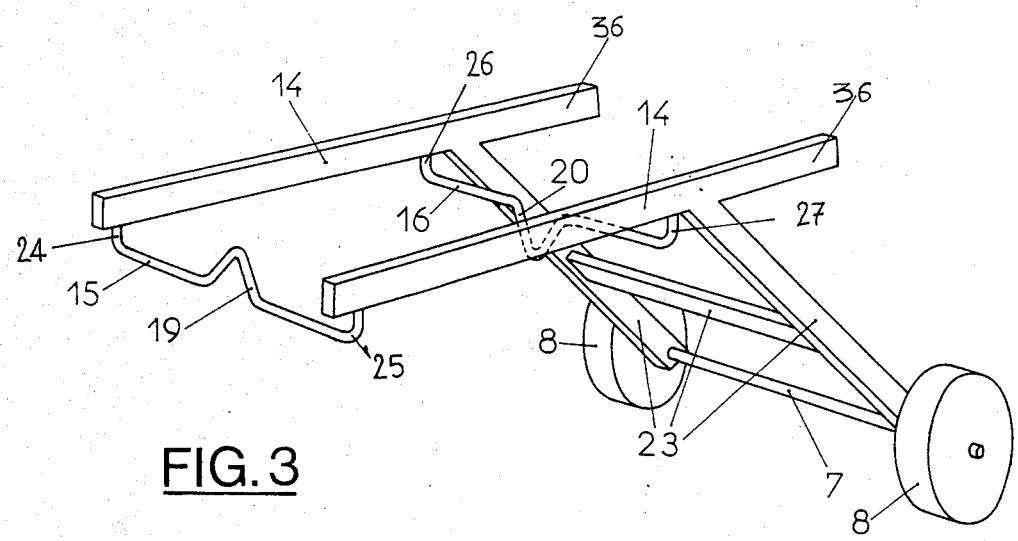
Figure 4:
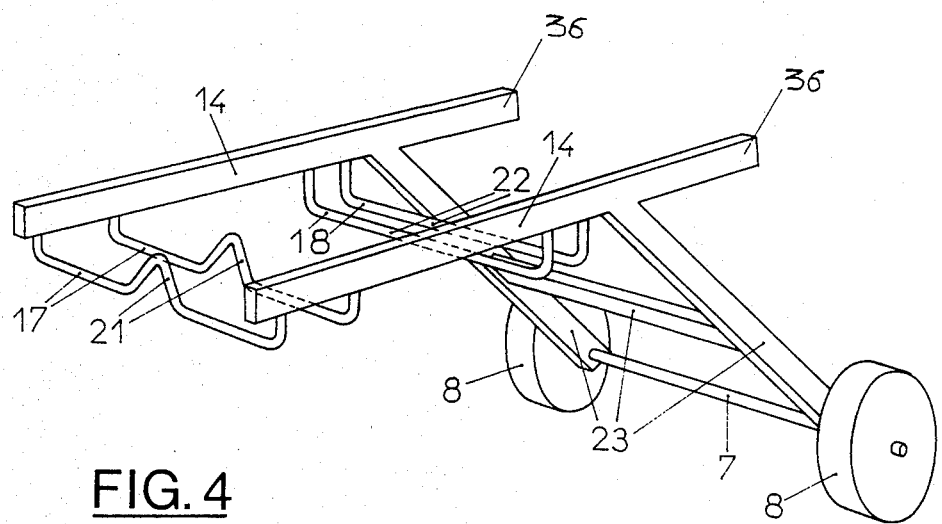
Figure 5:
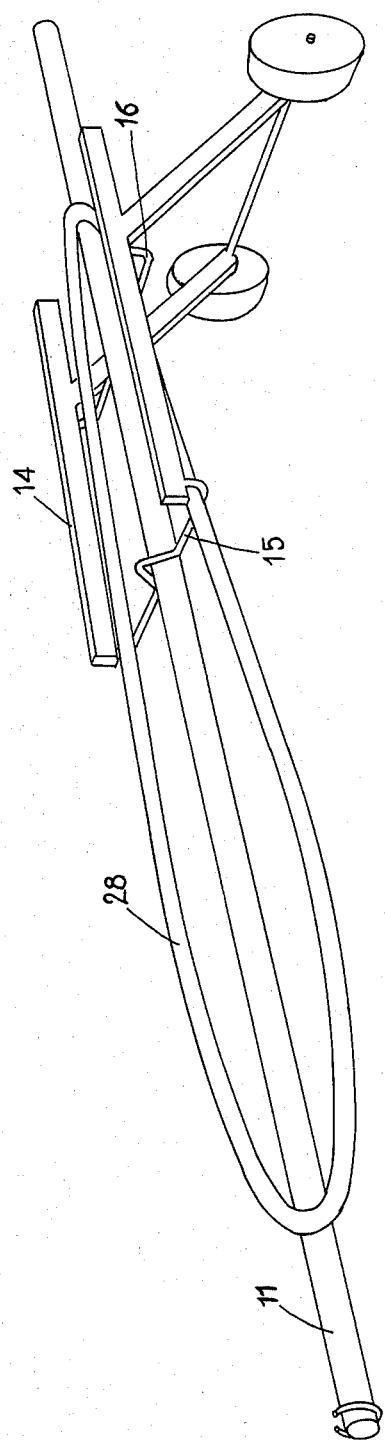
Figure 6:
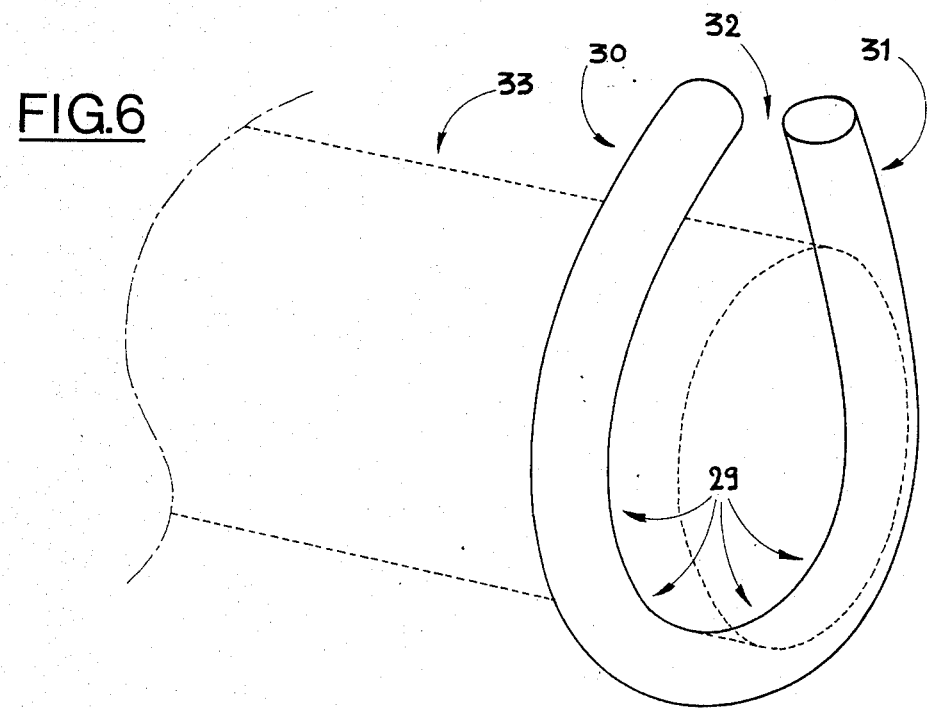
Figure 7:
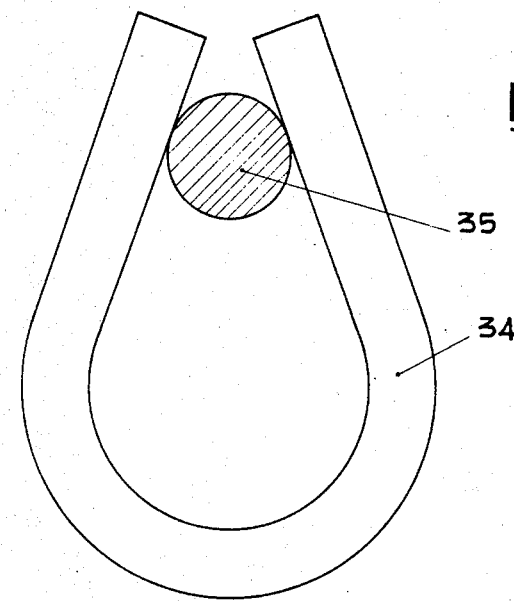

The above mentioned features as well as others will appear more clearly from the following description of embodiments, the decription being made in conjunction with the attached drawings, wherein:

FIG. 1 is a general perspective view of a first embodiment of the wheeled device according to this invention, FIG. 2 is a perspective view of a modified version of the wheeled device shown in FIG. 1, FIGS. 3 and 4 are the perspective views of a third and of a fourth embodiment of the wheeled device shown in FIG. 3, on which the mast and the wishbone have been put in place, FIG. 5 is a perspective view of a protecting device, and FIG. 7 is an elevation view of the protecting device shown in FIG. 6.

The wheeled device, shown in FIG. 1, is comprised of a front support 1 and a rear support 2. At the center of the rear support is, a generally U-shaped rear coupler or stop 3. The rear support 2 is secured to a suspension member 6 which is itself secured to the axle 7 of the wheels 8, in order to constitute the rear part of the wheeled device. A side-frame 9 secures the rear part to a front general U-shaped coupler or stop 10 and the front support 1. In FIG. 1, the wheeled device is shown attached to the mast 11 by means of the two mast couplers stops 3 and 10. A protecting device 12 is fastened at the end of the mast 11 which is located in front of the wheeled device.

In practice, the front support 1 is a rectangular transverse plate. A coupler or stop 10 is fixed on the underside of its lower face and in its middle part. The coupler or stop 10 is shaped as a longitudinal groove with the U-shaped opening turned downwardly. The internal diameter of stop 10 is slightly greater than the diameter of a mast in order to receive such a mast with the sail wrapped around it. The rear support 2 is also a rectangular transverse plate, but its length is greater than the length of the support 1. The middle part of the plate 2 has been shaped in order to form a longitudinal groove or coupler 3 with its U-shaped opening turned upwards. As with the groove or coupler 10, and for the same reason, the internal diameter of the groove 3 is slightly greater than the diameter of a mast. The positions of the grooves or couplers 3 and 10 are such that the mast is below the plane formed by the upper faces of the supports 1 and 2, the plane being horizontal when the mast set on the wheeled device is horizontal. The float of the sail board may thus rest on the supports 1 and 2, without contact with the mast.

The rear support 2 is secured to a suspension member 6, through the lower face of the groove or coupler 3, the member 6 itself being connected to the axle 7 of the wheels 8. The suspension member 6 is a bar which is oriented with an obtuse angle with respect to the front part of the mast placed on the wheeled device, so that the axle 7 of the wheels 8 is behind the rear support 2 when the mast is horizontal. A cylindrical side-frame 9 secures the rear part of the wheeled device comprising the support 2, the groove 3, the suspension member 6, the axle 7 and the wheels 8 is secured to the front part of the wheeled device which comprises the support 1 and the groove or coupler 10. The side-frame 9 is bent at its end adjacent to the suspension member 6. This end of the side-frame 9 is secured to the side of the suspension member 6, slightly below the groove 3. Its other end is secured to the lower face of the support 1 and to the upper face of the groove or coupler 10.

The wheeled device, shown in FIG. 2, is an alternative of the wheeled device shown in FIG. 1. It has substantially the same structure combination of the same elements previously described, except for two sideframes 13. Instead of a single frame, two parts 13 connect the rear part of the wheeled device comprising the rear support 2, the groove or coupler 3, the suspension member 6, the axle 7 and the wheels 8, to the front part comprising the front mast stop or coupler 10 and the front support 1.

FIGS. 3 and 4 illustrate other embodiments of the wheeled device. The wheeled device shown in either FIG. 3 or FIG. 4 comprises two parallel side-frames 14 are interconnected by means of front and rear crosspieces 15 and 16 in FIG. 3, or crosspieces 17 and 18 in FIG. 4. Such crosspieces are provided with generally U-shaped mast stops or couplers 19 and 20 in FIG. 3, and 21 and 22 in FIG. 4, and with recessed parts 24, 25, 26 and 27, in FIGS. 3 and 4, which make it possible to set the wishbone between the side-frames. The two side-frames 14 are secured to the axle 7 of the wheels 8 by means of a suspension number 23. It may be seen in particular in FIG. 3 that a front crosspiece 15 is provided with a front mast stop or coupler 19 for clamping the mast laterally and upwards. A rear crosspiece 16 is provided with a rear mast stop or coupler 20 for clamping the mast laterally and downwards. It may be seen in particular in FIG. 4 that two front crosspieces 17 are provided with a generally U-shaped front mast stop or coupler 21 for clamping the mast upwards while laterally and efficiently guiding the mast on its length. The rear mast stop or coupler 22 of the crosspieces 18 is only intended for clamping the mast downwards.

In practice, the crosspieces 15, 16 and 18 are made of cylindrical bars having the generally shape of a wide-mouthed U. They are secured to the lower face of the side-frames 14 through the ends 24, 25, 26 and 27 of the arms. The transverse mast stops 19, 20 and 21 are shaped in V and reversed V (the term "generally U-shape" also includes V-shaped) formed by bending the middle part of the crosspieces. The lengths of the arms 24, 25, 26 and 27 of the U-shaped pieces of the front and rear crosspieces are such that once the mast is set, it is in a plane parallel to the one defined by the upper faces of the side-frames 14; also, they are such that the float, set on the side-frames, is not in contact with the tip of the front stop. The suspension member 23 is shaped as an H of which each upper end is secured to a side-frame 14. The axle 7 of the wheels 8 passes through the lower part of the arms of the H. The plane of the H is at an obtuse angle with respect to the front part of the side-frames 14, so that the wheels are at the rear with respect to the rear crosspiece of the wheeled device when the mast is set horizontal. The side-frames 14 extend to the rear from the suspension member 23, and, thus, from the lugs 36 which allow a user to swing the wheeled device to the rear and to easily engage the mast in the stops.

The FIG. 5 shows the wheeled device of FIG. 3, on which the mast 11 and the wishbone 28 have been set. The mast is first placed; then, the wishbone is placed between the side-frames. Therefore, the wishbone rests on the rear crosspiece 16 through its two arms, and on the mast through one of its ends. The part of the wishbone 28 located between the side-frames does not come into contact with the float due to the U-shaped crosspiece. On the other hand, the front part of the wishbone constitutes an additional support for the float.

The ring device, as illustrated in FIG. 6, is made of a concave part 29 which extends symmetrically towards two ends 30 and 31 defining an opening space 32. The protecting member is pinched and thus fixed to one end 33 of the mast 11.

In FIG. 7, the open ring 34 is fastened to a part 35 of an element of the wheeled device.

The device may be used as a removable protecting device for one end of the mast of a sail board when the mast is used as a beam for a wheeled device attached on the length of the mast.

What is claimed is:

1. A wheeled device for for carrying sail boards, said device comprising a support on which a sail board float is set, a fast coupling system comprising a first generally U-shaped coupler facing downwardly, a second generally U-shaped coupler facing upwardly, said first and second couplers being aligned to receive a sail board mast which sets the sail board mast below a position for receiving the sail board float set on the said support, wherein one of the said two couplers blocks the mast from moving downwardly and from moving sideward along a rather long portion and the other of said two couplers blocking the mast from moving upwardly (or downwardly) without providing sideward blocking, and a spaced parallel pair of wheels mounted to roll along paths parallel to said mast.

2. The wheeled device according to claim 1, wherein the two couplers are a front coupler and a rear coupler, the front coupler blocking the mast from moving sideward and upwardly, and the rear coupler blocking the mast from moving sideward and downwardly, each coupler being made of a groove for receiving a cross-section of the mast and being open for enabling an entrance of the mast cross-section.

3. The wheeled device according to claim 1, which is further comprised of front and rear crosspieces each having one of said mast couplers and being interconnected by two side-frames constituting the sail board float support, a suspension coupled to an axle for supporting the wheels, the assembly of crosspieces and side-frames being secured to said suspension member.

4. The wheeled device according to claim 3, wherein the cross pieces are shaped to form said U-shape, each U having a large mouth, the side vertical branches of the U-shaped cross pieces being secured under the side-frames, said side vertical branches being long enough for to receive the sail board wishbone on the cross pieces with the sail board float being set on the side-frames.

5. A device for carrying a sail board comprising a wheeled device according to claim 3, which also comprises a protecting device for protecting one end of the sail board mast which allows the use of the sail board mast as a beam, the protected mast end being in front of the wheeled device.

6. The wheeled device according to claim 3, wherein portion of the side-frames project rearwardly to serve as stops when the wheeled device is moved in a backward direction.

7. The wheeled device according to claim 6, wherein the cross pieces are shaped to form said U-shape, each U having a large mouth, the side vertical branches of the U-shaped cross pieces being secured under the side-frames, said side vertical branches being long enough for to receive the sail board wishbone on the cross pieces with the sail board float being set on the side-frames.

8. A device for carrying a sail board comprising a wheeled device according to claim 6, which also comprises a protecting device for protecting one end of the sail board mast which allows the use of the sail board mast as a beam, the protected mast end being in front of the wheeled device.

9. The wheeled device according to claim 1 further comprising a support for a sail board float, said support having a front part and a rear part, the middle of the rear part having a rear stop secured to a suspension member coupled to the axle of the wheels, said suspension member being coupled to the front part by means of a side-frame which is located on one side of the rear stop and is secured to both the front part and the front stop.

10. A device for carrying a sail board comprising a wheeled device according to claim 9, which also comprises a protecting device for protecting one end of the sail board mast which allows the use of the sail board mast as a beam, the protected mast end being in front of the wheeled device.

11. The wheeled device according to claim 9, wherein there are two of said side-frames for coupling the rear part to the front part.

12. A device for carrying a sail board comprising a wheeled device according to claim 11, which also comprises a protecting device for protecting one end of the sail board mast which allows the use of the sail board mast as a beam, the protected mast end being in front of the wheeled device.

13. The wheeled device according to claim 2, wherein each of said U-shaped couplers has an angular V-shaped bottom to provide a point-clamping of the mast.

14. The wheeled device according to claim 1, wherein each of said U-shaped couplers has an angular V-shaped bottom to provide a point-clamping of the mast.

15. The wheeled device according to claim 14, and an axle for supporting the spaced pair of wheels, said axle being located far enough behind the center of gravity of said device when unloaded to jam the mast between the said couplers, whereby setting the sail board float on the support increasing the jamming action.

16. The wheeled device according to claim 10, and an axle for supporting the spaced pair of wheels, said axle being located far enough behind the center of gravity of said device when unloaded to jam the mast between the said couplers, whereby setting the sail board float on the support increasing the jamming action.

17. The wheeled device according to claim 1, and an axle for supporting the spaced pair of wheels, said axle being located far enough behind the center of gravity of said device when unloaded to jam the mast between the said couplers, whereby setting the sail board float on the support increasing the jamming action.

18. A device for carrying a sail board comprising a wheeled device according to claim 2, which also comprises a protecting device for protecting one end of the sail board mast which allows the use of the sail board mast as a beam, the protected mast end being in front of the wheeled device.

19. A device for carrying a sail board comprising a wheeled device according to claim 1, which also comprises a protecting device for protecting one end of the sail board mast which allows the use of the sail board mast as a beam, the protected mast end being in front of the wheeled device.

20. The device according to claim 19, wherein the protecting device is a removable resilient open ring member which protects the said mast end by its outside surface, which may be clamped about the mast end, the open ring member having a concave portion symmetrically extended up to two ends which define an open interval having a width smaller than the diameter of the mast end.

* * * * *